(12) United States Patent
Stacy

(10) Patent No.: US 7,804,501 B2
(45) Date of Patent: Sep. 28, 2010

(54) OBJECT LOADING AND UNLOADING SYSTEM

(75) Inventor: Joseph F. Stacy, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 11/275,131

(22) Filed: Dec. 13, 2005

(65) Prior Publication Data
US 2007/0132752 A1    Jun. 14, 2007

(51) Int. Cl.
*G06T 17/00*    (2006.01)
(52) U.S. Cl. ..................... 345/428; 345/629; 345/632
(58) Field of Classification Search ............. 345/632, 345/428
See application file for complete search history.

(56) References Cited
U.S. PATENT DOCUMENTS
2004/0263512 A1* 12/2004 Santodomingo et al. .... 345/428
2005/0171754 A1*  8/2005 Santodomingo et al. ...... 703/21

OTHER PUBLICATIONS

Orenstein, David. "QuickStudy: Application Programming Interface (API)." Computerworld—News, Education & Headlines—Security, Storage & Networking—Information on Hardware, Software for Laptops & Desktops. Jan. 1, 2000. Web. Nov. 5, 2009. http://www.computerworld.com/s/article/43487/Application_Programming_Interface?taxonomyId=63&pageNumber=1.*

* cited by examiner

*Primary Examiner*—Xiao M Wu
*Assistant Examiner*—Scott E Sonners
(74) *Attorney, Agent, or Firm*—Workman Nydegger

(57) ABSTRACT

An object loading and unloading system for loading and unloading objects in a graphically simulated virtual environment, or virtual world, is described. A world object manager manages multiple object loaders to load and unload objects as geographic cells move within and out of a loading radius of each loader based on a position of a camera or view within the virtual world. Each object loader has an associated priority level, and the world object manager notifies a loader to load its corresponding objects in a cell only after all loaders having higher priority levels, which also have that cell in their respective loading radii, have already loaded their corresponding objects in that cell. The world object manager may expose various programming interfaces to provide an extensible object loading system whereby third parties can define new loaders to be incorporated into the hierarchical spatial object loading system.

19 Claims, 10 Drawing Sheets

1) Set center of view to camera location
2) For each loader's cache
    For each incoming region in the loader's cache
        If all higher priority loaders have loaded in this region
            Send notification to loader to load this region
            Mark region as *Load Notification Sent* (set LoadNotification flag)

Else
            Skip region (continue processing others)
    For each outgoing region in the loader's cache
        Send notification to loader to unload this region
        Mark region as *Load Notification Not Sent* (reset LoadNotification flag)
        Mark region as Unloaded (reset Loaded flag)
3) Upon receipt of a LoadCompletion Notification:
    Mark region as Loaded (set Loaded flag)
    Perform step 2, above, for lower priority loaders in that region.

*FIG. 6*

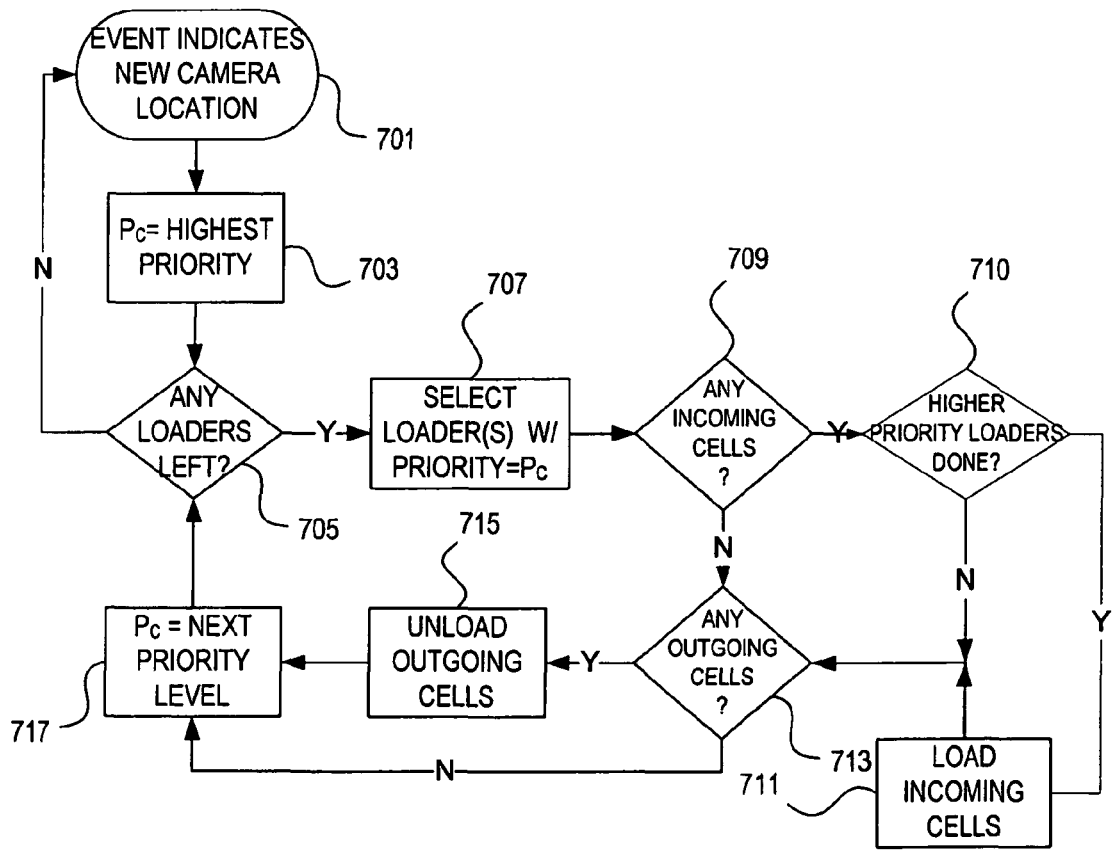

*FIG. 7*

OBJECT LOADING AND UNLOADING SYSTEM

BACKGROUND

Almost every game being developed immerses a player in a graphically depicted virtual world. However, realistic graphic visual representation of virtual worlds and simulated environments is a complex and difficult task. Software developers must trade off realism with efficiency. As the software is instructed to place more objects in the simulated environment, thus providing more realism, computer performance suffers because management of more objects requires more processor time and memory. In addition, software developers must trade off manual versus automatic creation and placement of objects. For example, a software developer might create a realistic forest area by manually placing each object (e.g., tree, bush, fallen branch, stream, deer, etc., in a specific location within the forest area. As the forest area becomes larger, however, manual placement becomes difficult and tedious.

In populating objects into a virtual world on the scope of an entire planet, it becomes almost impossible to place every single object correctly with respect to every other object. For example, as the size of the simulated environment increases, it becomes necessary to automate the creation process, allowing a computer to automatically determine where to place objects. However, it is difficult to instruct automated processes how to resolve conflicts between two objects competing for the same location, e.g., trees and roads should not be randomly placed on top of buildings, etc. For instance, a software application might annotate types of ground coverage in areas where trees are likely. When generic tiles are used with the corresponding automatically placed objects, such as trees, there can be conflicts between the placement of the automatically placed objects (trees) and manually placed, known objects (e.g., the Space Needle). Thus, it would be an advance in the art to provide an extensible system to layer dependent spatial data. It would be a further advance in the art to provide a mechanism to automatically place objects in a manner so as not to conflict with other automatically placed objects as well as with manually placed objects.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Features described herein work together to load objects in a graphically depicted simulated environment in a generic and extensible manner guided by hierarchical spatial data structures. In this spirit, a first aspect provides a method of loading virtual objects in a graphically simulated virtual environment divided into a grid of cells. The method defines multiple loaders, where each loader loads a corresponding type of object, and each loader has a priority level and a loading radius. A manager module determines a current camera position within the virtual environment, and identifies any cells within the loading radius of a first loader based on the current camera position which were not within the loading radius of the first loader based on a previous camera position. For each identified cell, the world object manager sends a notification to the first loader after any loaders having a higher priority level than the first loader have loaded their corresponding objects in the identified cell. The notification notifies the first loader to load its corresponding type of objects in the identified cell.

Another aspect provides code modules that interact to load objects in a graphically simulated virtual environment. There may be multiple loader modules, where each loader module loads a predefined type of object in the graphically simulated virtual environment. Each loader module has a corresponding priority level and a corresponding loading radius. A world object manager module notifies each loader module to load objects in a cell within the loading radius of the loader module from a current camera position, but only after all higher priority loader modules having the cell within their respective loading radii have already loaded objects in that cell.

According to another aspect, the world object manager may expose one or more programming interfaces to provide extensibility of loader modules. For example, the world object manager may expose a programming interface for registering a new loader module. The world object manager may expose a programming interface for a new loader module to identify a routine to be called by the world object manager when a cell is determined to enter a loading radius of the new loader module. The world object manager may expose a programming interface for a new loader module to identify a routine to be called by the world object manager module when a cell is determined to leave a loading radius of the new loader module. The world object manager may define a data type describing a generic loader module, and the programming interface to register a new loader module receives a pointer to an instance of the data structure describing the new loader module.

Yet another aspect may provide an object loading and unloading system for loading and unloading objects in a graphically simulated virtual environment, or virtual world. A world object manager may manage multiple object loaders to load and unload objects as geographic cells move within and out of a loading radius of each loader based on a position of a camera or view within the virtual world. Each object loader has an associated priority level, and the world object manager notifies a loader to load its corresponding objects in a cell only after all loaders having higher priority levels, which also have that cell in their respective loading radii, have already loaded their corresponding objects in that cell. The world object manager may expose various programming interfaces to provide an extensible object loading system whereby third parties can define new loaders to be incorporated into the hierarchical spatial object loading system.

BRIEF DESCRIPTION OF THE DRAWINGS

A more complete understanding of the features described herein and the advantages thereof may be acquired by referring to the following description in consideration of the accompanying drawings, in which like reference numbers indicate like features, and wherein:

FIG. 6 illustrates pseudocode according to one or more illustrative aspects described herein.

FIG. 7 illustrates a method for loading and unloading objects according to one or more illustrative aspects described herein.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Illustrative Operating Environment

Figure 1A:
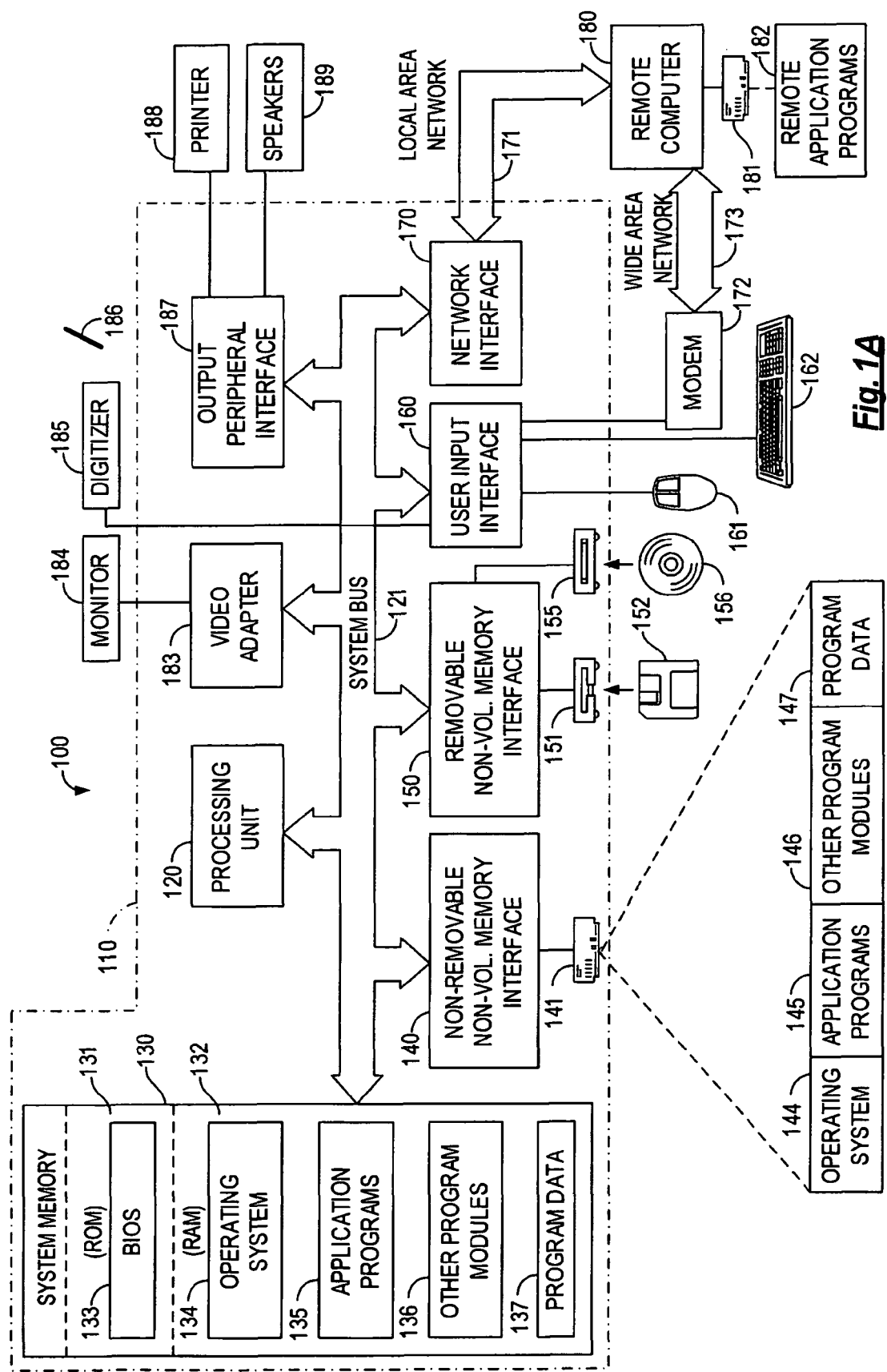
FIG. 1A illustrates a schematic diagram of a general-purpose digital computing environment in which certain aspects may be implemented.

FIG. 1A illustrates an example of a suitable general purpose computing system environment 100 on which a virtual world may be graphically simulated. The computing system environment 100 is only one example of a suitable computing environment and is not intended to suggest any limitation as to the scope of use or functionality of features described herein. Neither should the computing environment 100 be interpreted as having any dependency or requirement relating to any one or combination of components illustrated in the exemplary operating environment 100.

Aspects are operational with numerous other general purpose or special purpose computing system environments or configurations. Examples of well known computing systems, environments, and/or configurations that may be suitable for use with aspects of the invention include, but are not limited to, personal computers; server computers; portable and handheld devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1A, an illustrative system for implementing one or more aspects of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 184 or other type of display device is also connected to the system bus 121 via an interface, such as a video interface 183. Computer 110 may also include a digitizer 185 for use in conjunction with monitor 184 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 182 as residing on memory device 181. It will be appreciated that the network connections shown are exemplary and other means of establishing a communications link between the computers may be used.

One or more aspects of the invention may be embodied in computer-executable instructions (i.e., software), such as in a notification manager software object, routine or function (collectively referred to herein as a notification manager) stored in system memory 130 or non-volatile memory 141, 152, 156 as application programs 135, 145, program modules 136, 146, and/or program data 137, 147. The software may alternatively be stored remotely, such as on remote computer 180 with remote application programs 182. Generally, program modules include routines, programs, objects, components, data structures, etc. that perform particular tasks or implement particular abstract data types when executed by a processor in a computer or other device. The computer executable instructions may be stored on a computer readable medium such as a hard disk 141, optical disk 156, removable storage media 152, solid state memory, RAM 132, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1B:
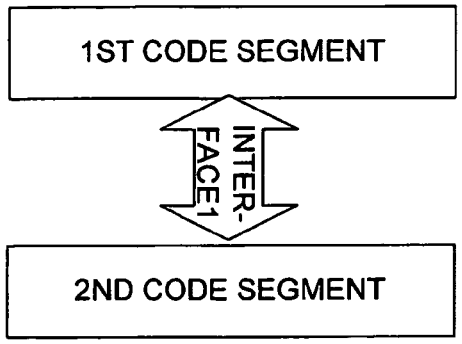
FIGS. 1B through 1M show a general-purpose computer environment supporting one or more aspects described here.
Figure 1C:
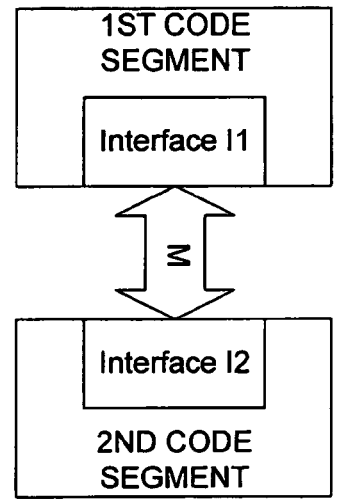

Nationally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. There are, however, other ways to implement a programming interface, and, unless expressly excluded, these to are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

Figure 1D:
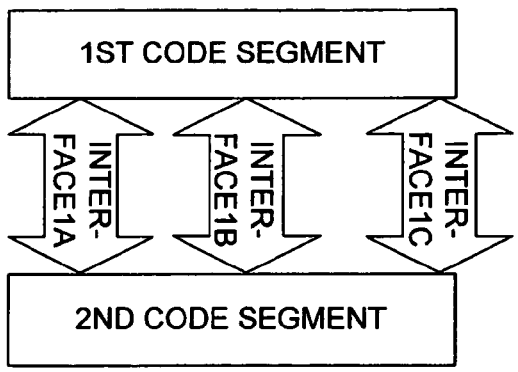
Figure 1E:
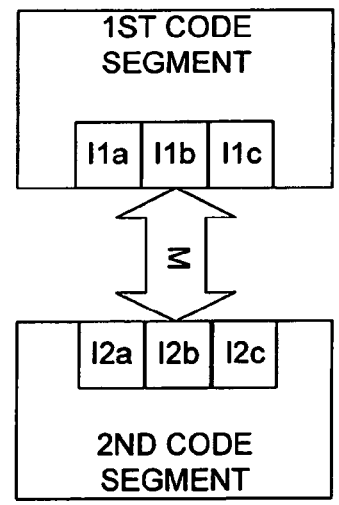

FACTORING: A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIG. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 1F:
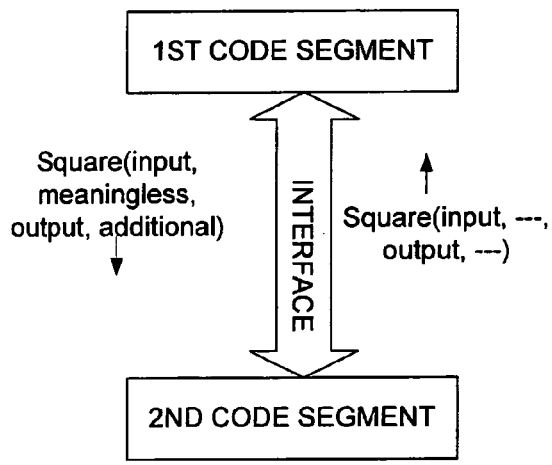
Figure 1G:
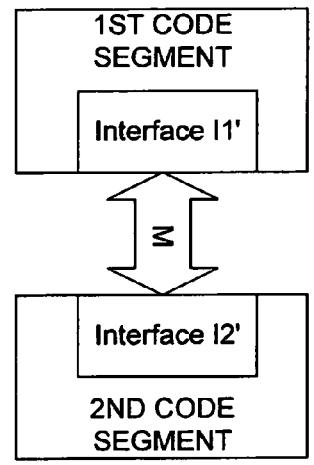

REDEFINITION: In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

Figure 1H:
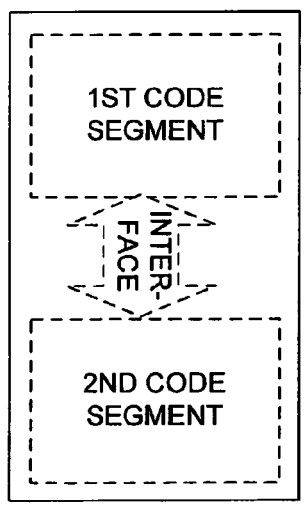
Figure 1I:
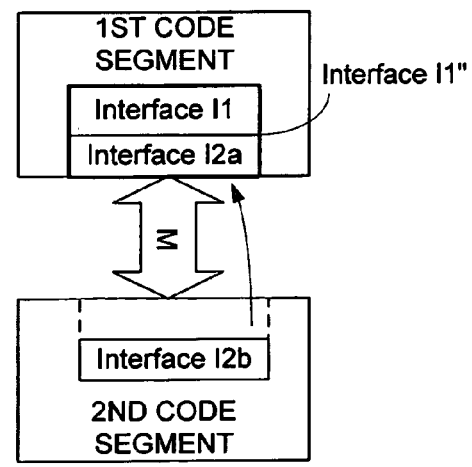

INLINE CODING: It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 1J:
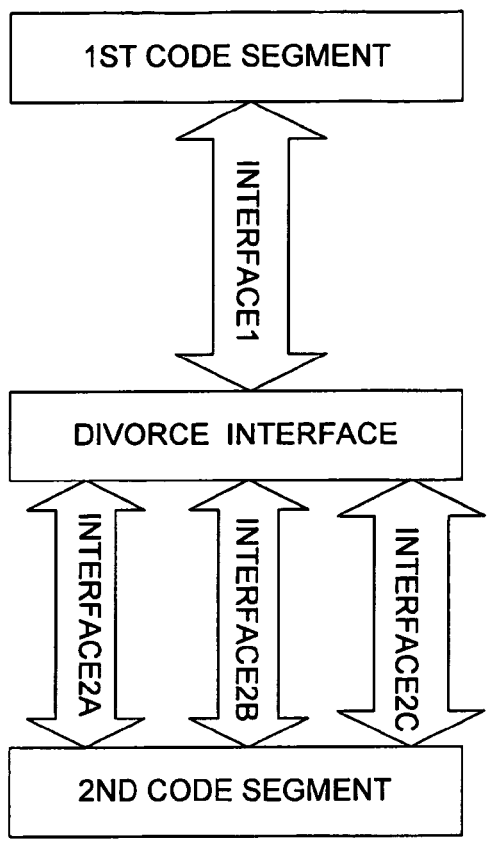
Figure 1K:
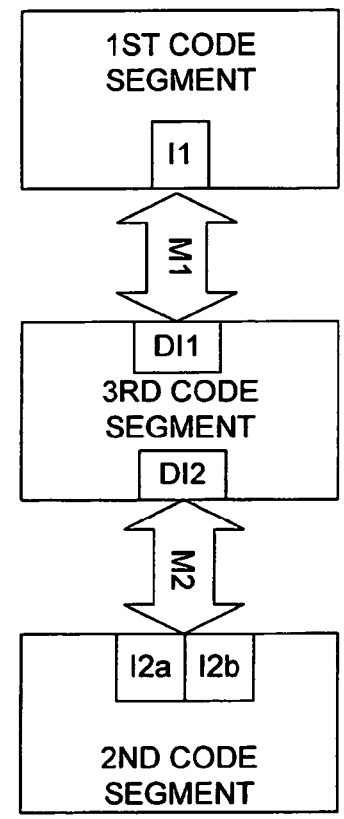

DIVORCE: A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG.

1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

Figure 1L:
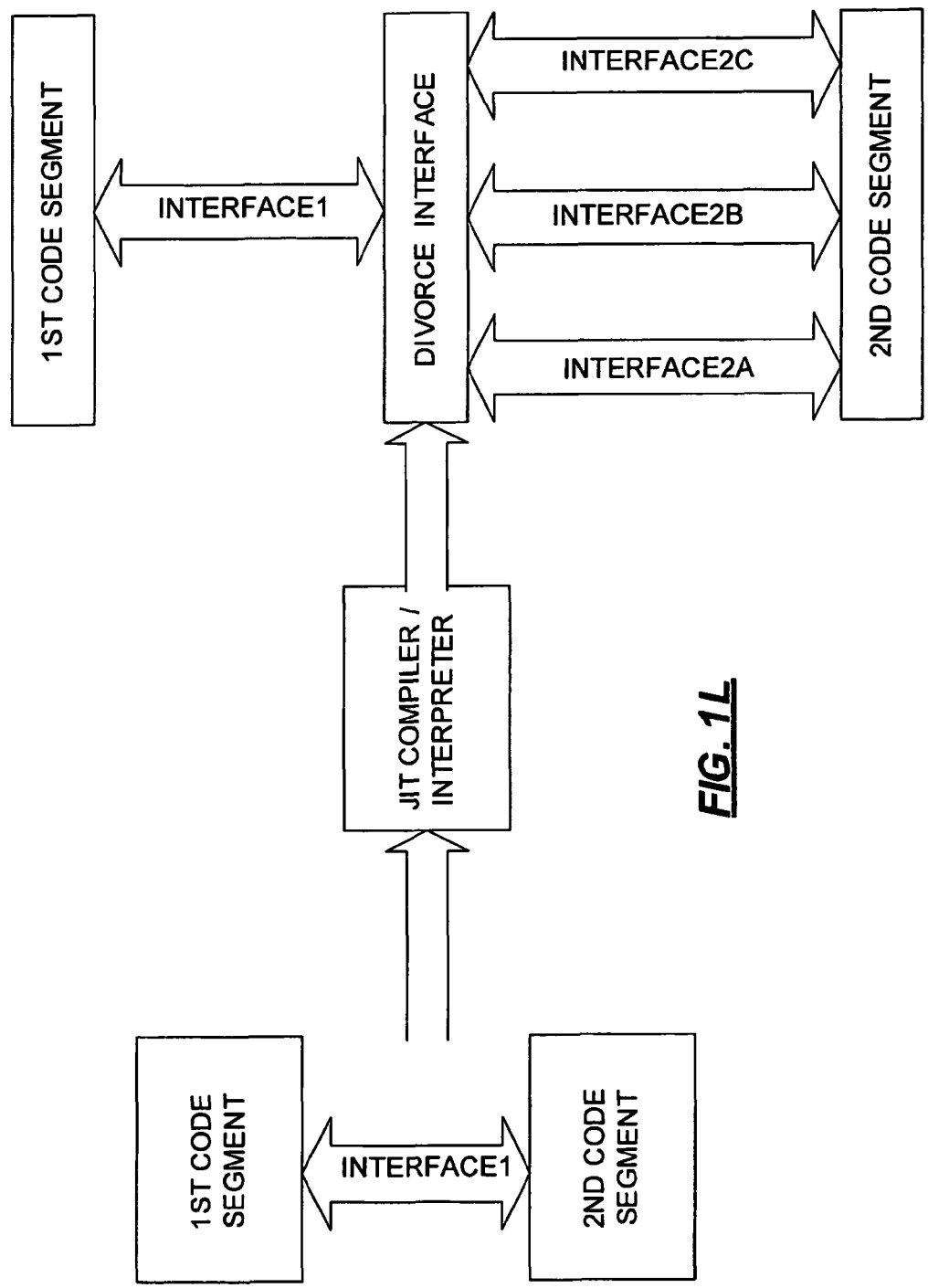
Figure 1M:
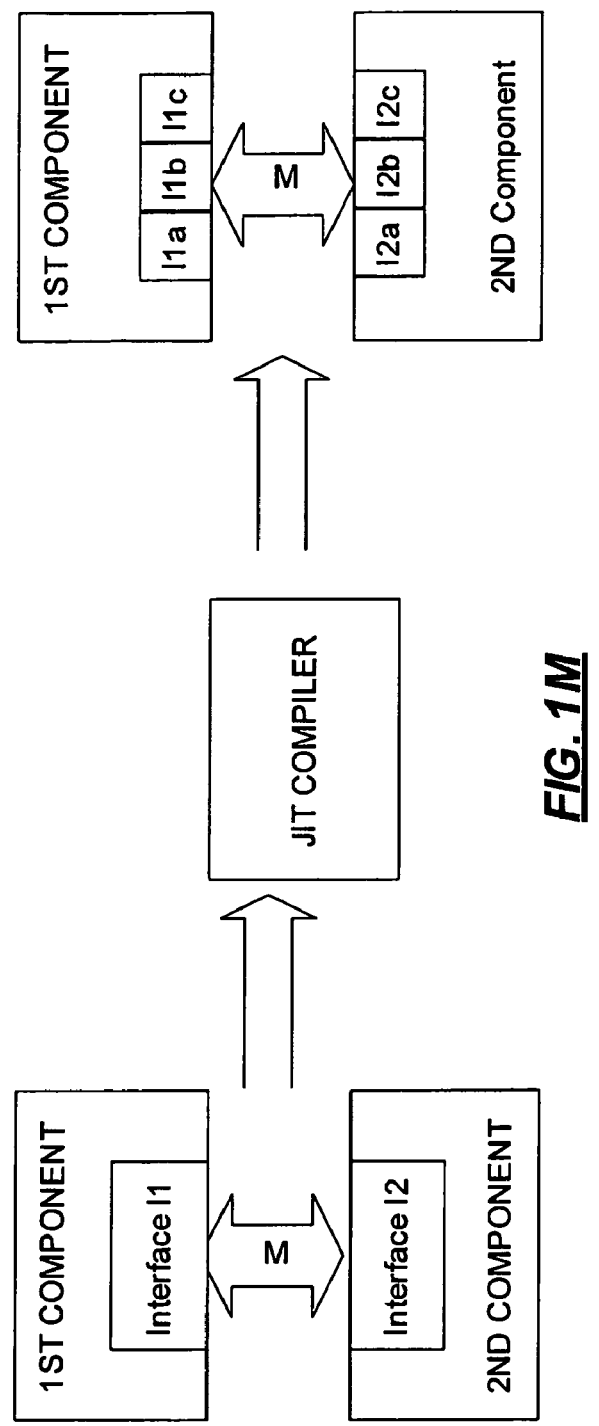

REWRITING: Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface (s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Illustrative Embodiments

Various aspects described herein are directed to extensible methods and systems to layer dependent spatial data, which can be used to layer objects within a graphically simulated virtual environment in a generic and extensible manner guided by hierarchical spatial data structures. These data structures are maintained and controlled by a world object manager (WOM, discussed below) managing a set of loaders. A loader refers to an instance of an object based on a generic loader type, e.g., one or more software routines, objects, and/or functions, responsible for placing any set of objects in a graphically simulated virtual environment, or virtual world.

Each loader is generally responsible for a common type of object, however, loaders may be responsible for any desired set of objects. For example, a first loader may be responsible for terrain, e.g., grass, lakes, snow, etc., within the virtual world; a second loader may be responsible for custom or manually placed objects, e.g., landmarks, notable buildings and known sites (e.g., Mt. Rushmore, the Space Needle, the Sears Tower, JFK and La Guardia airports, etc.); and third loader might be responsible for fill-in and terrain cover objects (e.g., trees) based on terrain to provide "finishing details" in the virtual world. These are but three examples, and other loaders may also or alternatively be used. For example, a separate loader might be responsible for weather-based objects such as clouds, rain, sleet, hail, snow, etc. Another loader might be responsible for specific event objects, e.g., tornado, fire, etc.

Each loader may have an associated priority level, cell size, and loading radius. The priority level indicates an order in which the loader's corresponding objects should be loaded into the virtual world. According to an illustrative aspect, each loader waits to load objects into the virtual world until after all loaders having a higher priority level have finished loading their respective objects. In some embodiments, each loader may have a different priority level. In other embodiments, multiple loaders may have the same priority level. The cell size indicates the level of granularity with which the loader places objects in the virtual world. That is, the cell size indicates the size of the cells into which the virtual world is divided with respect to that loader. A cell refers to one or more portions of a virtual environment handled by a loader. Different loaders may define different cell shapes and sizes, depending on the type of feature implemented by the loader. Alternatively, loaders may all use similar cell shapes (e.g., squares) with the same or different cell sizes. For example, a loader responsible for inserting well-known landmarks might use a handful of larger cells for the entire United States, whereas a loader responsible for terrain might use many smaller cells for the United States. Cells may be two-dimensional, but may be alternatively defined in three dimensions. The loading radius indicates how far out from a camera location in the virtual world that loader loads its objects.

For example, a terrain loader might have priority level 1 (indicating that it should load first, i.e., the ground needs to be defined before anything can be placed on top of it), a cell size of 1 km 1 km (meaning that each terrain type extends for at least 1 km in the virtual world), and a loading radius of 100 km (meaning that any cell for which any portion of that cell is within 100 km of the present camera location gets loaded). A custom object loader might have priority level 2 (indicating that custom objects should be placed after the terrain is set, but before the placement of terrain cover such as trees, bushes, etc.), a cell size of 500 m (which results in the placement of custom objects within 500 m accuracy), and a loading radius of 66 km. A fill-in loader might have priority level 3 (i.e., fill in the trees, roads, etc. wherever there is empty space in the cell, up to a certain density, but not on custom placed objects), a cell size of 250 m (thereby being able to differentiate between trees, bushes, etc., every 250 m), and a loading radius of 33 km (e.g., because the level of detail provided by the fill-in loader is typically not visibly recognizable from farther distances. Given their respective priority levels, and as further discussed below, each loader ensures that it avoids conflicts with objects already placed in the virtual environment, based on the knowledge that higher priority loaders have already completed processing for the given regions and so the current loader can place objects anywhere it wants that does not cause a conflict with a preexisting object. Conflicts do not include lower priority loaders purposefully placing an object on a previously placed object, e.g., a lower priority loader might place helipads on top of one or more pre-placed building objects, from which a helicopter could take off or land in a flight simulation type game.

Any cell size may be used as desired, however, smaller cell sizes typically require more management overhead. Thus, there is a tradeoff between accuracy and performance. Also, each loader need not necessarily have different priority levels, although in some embodiments each loader has a unique priority level. That is, multiple loaders might have the same priority level. Loaders that place objects in mutually exclusive locations might have the same priority level. For example, a loader for placing cloud objects might have the same priority level as a loader that places terrain, if the particular implementation determines that clouds are never in the same space as terrain (although they may extend up to and next to each other, clouds and terrain never occupy the same physical space). Regardless of having a same priority level, each loader's cell size and loading radius may be the same or may differ.

Each loader's loading radius may be determined based on how far away the objects loaded by that loader are visible or detectable, or should be visible or detectable. A loader for ground terrain, e.g., has a large loading radius because, even from long distances, the general type of ground terrain is visibly detectable. Real world visibilities may be used to model loading radii of various loaders based on the type of objects loaded by each loader. A loading radius may alternatively be based on performance considerations, e.g., where there is high object density a lower loading radius may be used to control the number of objects loaded. A combination of visibility and performance may also be used to determine a loading radius.

Figure 2:
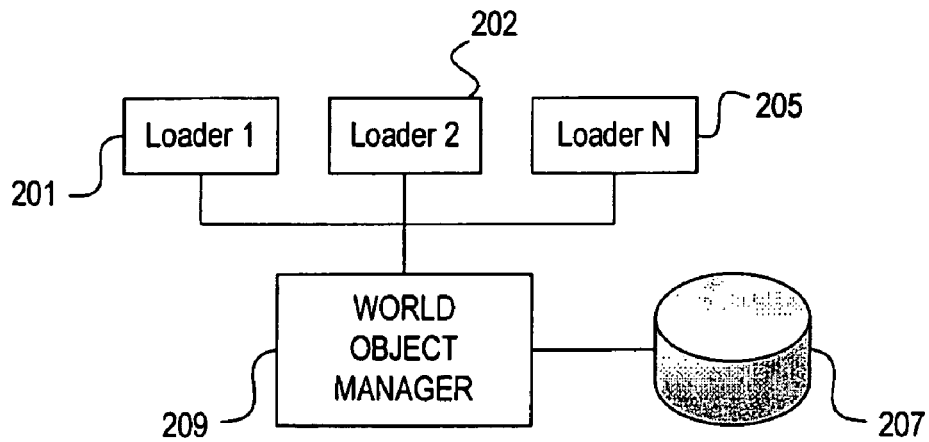
FIG. 2 illustrates a software architecture according to one or more illustrative aspects described herein.

FIG. 2 illustrates a software architecture that may be used according to one or more illustrative features of the invention. In FIG. 2, each of N loaders 201, 202, 205 registers with world object manager (WOM) 209, indicating its characteristics, such as priority level, cell size, and loading radius (as measured from a camera or view location in the virtual world). WOM 209 communicates with database 207, which indicates for each cell in the virtual world a present state of each loader, e.g., loaded or unloaded. Thus, database 207 may maintain one flag per loader per cell, e.g., in an array, grid, table, list, or any other data structure or combination of data structures. Database 207 may maintain flags based on the smallest allowable cell size, thus being able to accommodate all loader cell sizes by grouping flags for loaders having a cell size larger than the minimum allowable cell size, or database 207 may maintain multiple flag data structures, each having a different allowable cell size based on the loader. As a loader loads and unloads objects into and out of a cell, the loader notifies WOM 209, which in turn updates the appropriate flags in database 207. While database 207 is shown separate, database 207 may alternatively be incorporated into another module, e.g., within WOM 209.

Aspects may be repeated per camera view in a virtual world. That is, if there are multiple cameras in the virtual world, then WOM 209 may maintain a database 207 for each view, and manage loading and unloading of objects in each view. Alternatively, the database 207 may manage flags for the entire virtual environment, and thus each view shares the common pool of flags. In another variation there may be multiple World Object Managers, one per camera or view. Yet another alternative is for WOM 209 to notify loaders to load objects in any cell visible in at least one view.

Figure 3:
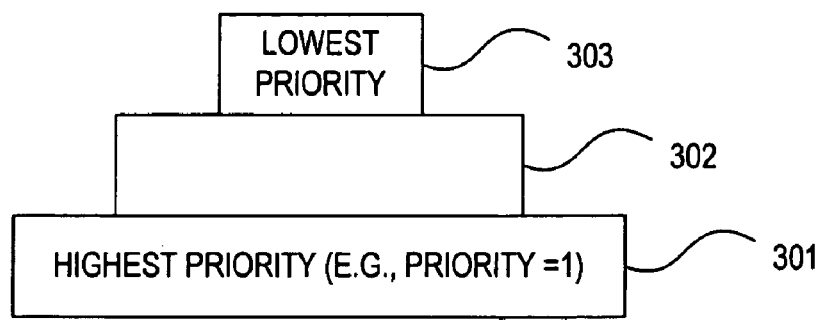
FIG. 3 illustrates a hierarchical relationship among multiple loaders according to one or more illustrative aspects described herein.

An illustrative example will now be explained in detail with reference to FIGS. 3-5. FIG. 3 illustrates a conceptual hierarchy of three prioritized loaders 301, 302, 303. Loader 301 may have priority level 1, a 1 km cell size, and a 100 km loading radius. Loader 302 may be responsible, e.g., for terrain. Loader 302 may have priority level 2, a 1 km cell size, and a 66 km loading radius. Loader 302 may be responsible, e.g., for manually placed objects on the terrain. Loader 303 may have priority level 3, a 1 km cell size, and a 33 km loading radius. Loader 303 may be responsible, e.g., for fill-in objects such as trees and bushes. Each loader has a common cell size for illustrative purposes only. As discussed above, cell sizes may differ as desired.

Figure 4:
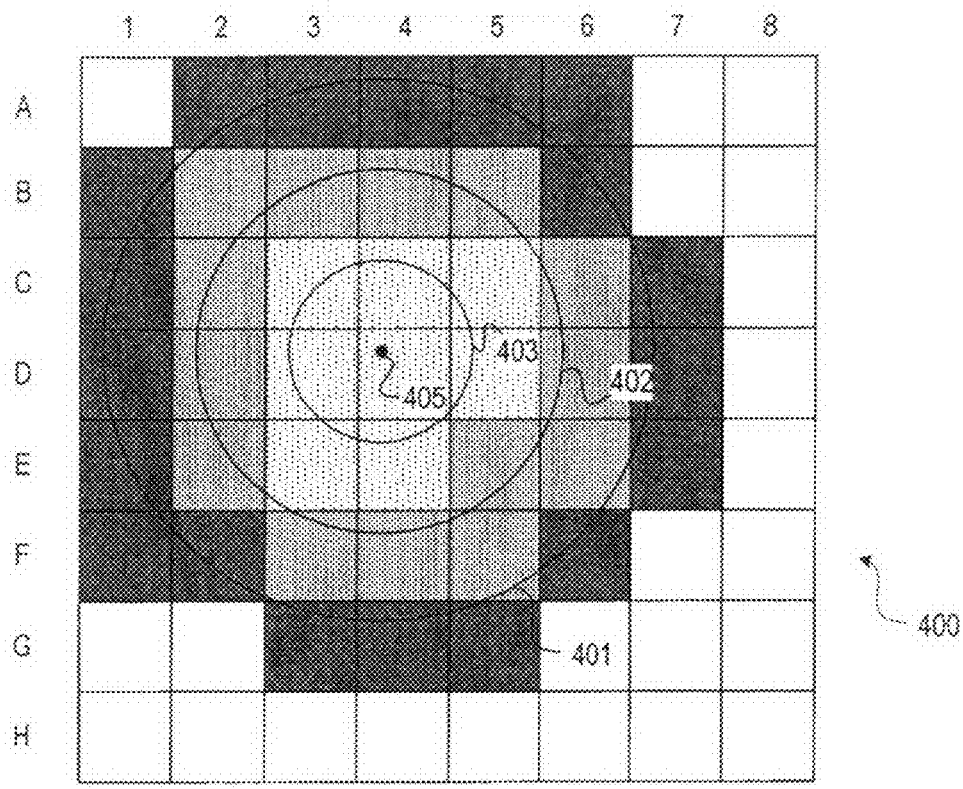
FIG. 4 illustrates a terrain map according to one or more illustrative aspects described herein.

FIG. 4 illustrates a terrain map 400, which represents a virtual world as a grid of cells. Terrain map 400 includes a present camera location 405, from which each loading radius 401, 402, 403 is determined. Loading radius 401 corresponds to loader 301; loading radius 402 corresponds to loader 302; and loading radius 403 corresponds to loader 303. As illustrated in FIG. 4, loading radius 401 for loader 301 includes all shaded cells, namely, A2-A6, B1-B6, C1-C7, D1-D7, E1-E7, F1-F6, and G3-G5. Loading radius 402 for loader 302 includes the light and medium shaded cells, namely, B2-B5, C2-C6, D2-D6, E2-E6, and F3-F5. Loading radius 403 for loader 303 includes only the light shaded cells, namely, C3-C5, D3-D5, E3, and E4.

Figure 5:
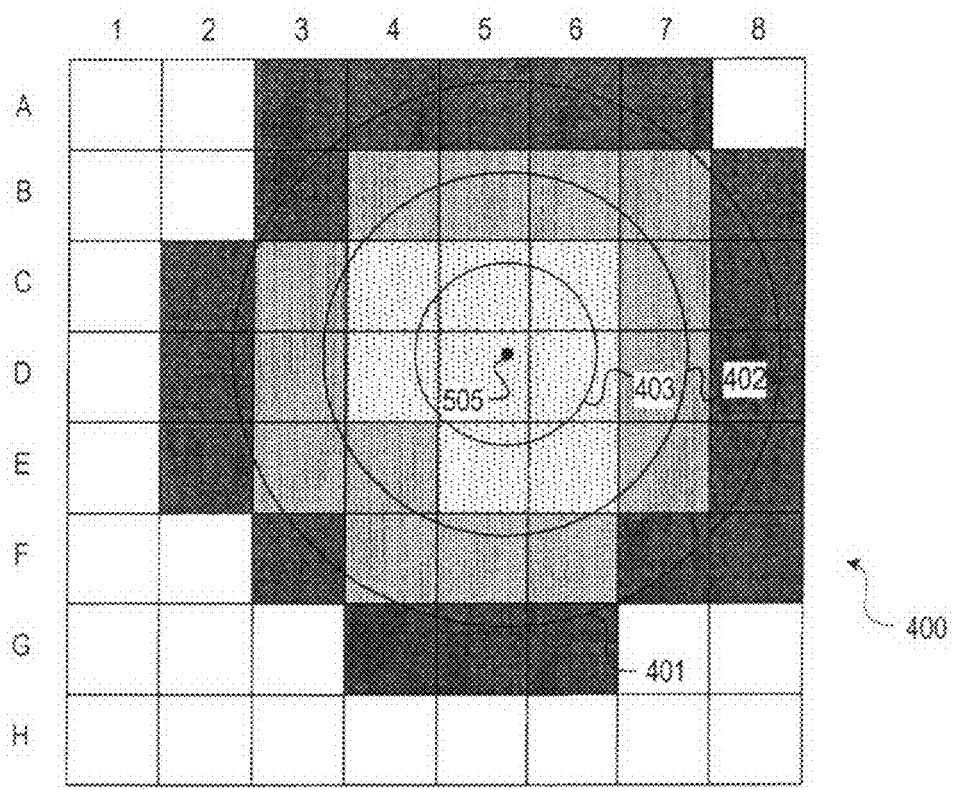
FIG. 5 illustrates the terrain map of FIG. 4 after a camera movement according to one or more illustrative aspects described herein.

FIG. 5 illustrates terrain map 400 after the camera moves to location 505. As illustrated in FIG. 5, loading radius 401 for loader 301 includes all shaded cells, namely, A3-A7, B3-B8, C2-C8, D2-D8, E2-E8, F3-F8, and G4-G6. Loading radius 402 for loader 302 includes the light and medium shaded cells, namely, B4-B7, C3-C7, D3-D7, E3-E7, and F4-F6. Loading radius 403 for loader 303 includes only the light shaded cells, namely, C4-C6, D4-D6, E5, and E6.

When a cell moves into a loader's loading radius, e.g., as a result of movement of the camera location, that cell is said to be an incoming cell. When a cell moves out of a loader's loading radius that cell is said to be an outgoing cell. Table 1, below, illustrates incoming and outgoing cells for loaders 301, 302, 303 (corresponding to loading radius 401, 402, 403, respectively), as a camera moves from location 405 (FIG. 4) to location 505 (FIG. 5):

TABLE 1

| Loader | Incoming | Outgoing |
| --- | --- | --- |
| Loader 301 | A7, B7, B8, C8, D8, E8, F7, F8, G6 | A2, B1, B2, C1, D1, E1, F1, F2, G3 |
| Loader 302 | B6, B7, C7, D7, E7, F6 | B2, B3, C2, D2, E2, F3 |
| Loader 303 | C6, D6, E5, E6 | C3, D3, E3, E4 |

The camera may be representative of a present graphical depiction of a scene or view within the virtual world displayed on an output device, such as a monitor, LCD display, television, etc. The camera position may, e.g., be representative of a position of a user controlled element within the virtual world, such as a view from a cockpit of an airplane navigating a virtual world controlled by a flight simulation program. As the camera moves through the virtual world, WOM 209 monitors incoming and outgoing cells and compares them with database 207 to determine which cells are to be loaded and unloaded by each loader. The WOM 209 notifies loaders to load and unload objects as applicable. FIG. 6 illustrates pseudocode which may be used by WOM 209 to manage object loading and unloading notifications to the one or more loaders. The pseudocode of FIG. 6 is but one example, and other algorithms may be used, provided each loader only loads or unloads a regiong upon receiving a corresponding notification from the WOM 209. WOM 209, on the other hand, only sends a load notification to a loader for a particular region after all higher priority loaders also encompassing that region have finished loading in that region, e.g., as indicated by the loader calling the WOM to tell the WOM that the loader has finished for that particular region. The pseudocode of FIG. 6 may be performed by an asynchronous and/or multithreaded process, where each of the three pseudocode sections are performed asynchronously and not necessarily in the recited order.

Figure 8:
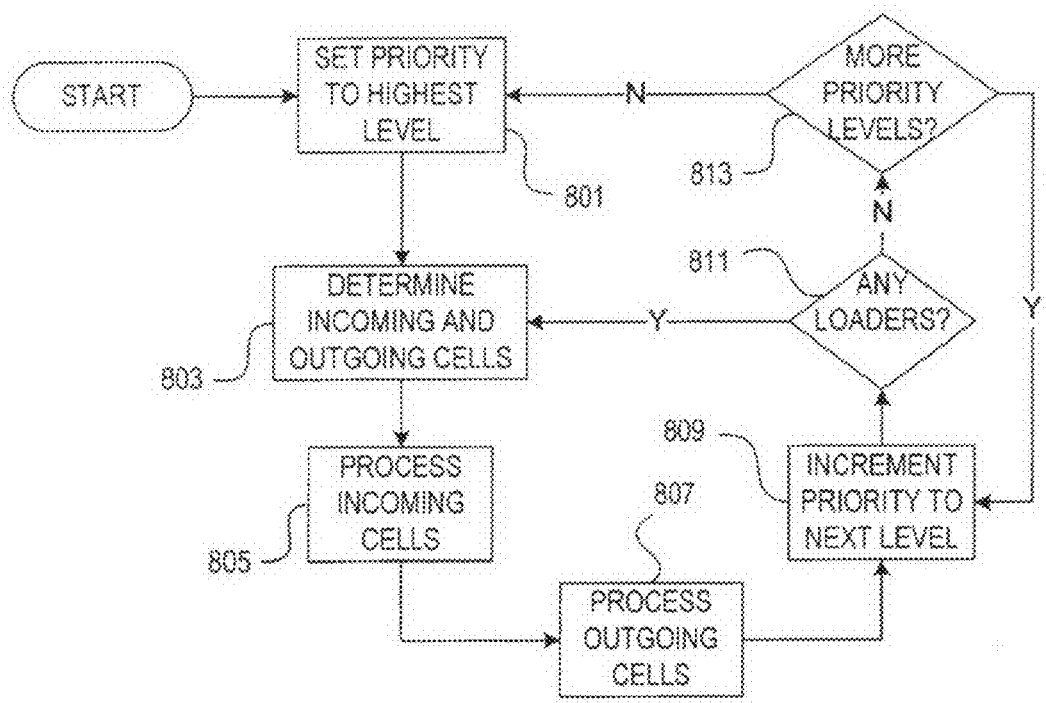
FIG. 8 illustrates an alternative method for loading and unloading objects according to one or more illustrative aspects described herein.

FIG. 7 illustrates an example of a method which may be used to implement the pseudocode of FIG. 6. Again, the method of FIG. 7 is but one example, and other methods may be used to similarly implement the pseudocode of FIG. 6. For example, FIG. 8 illustrates an alternative method of implementing the psuedocode of FIG. 6, and is described in more detail below.

The method of FIG. 7 begins in step 701 when WOM 209 receives a new camera location or an indication that the camera location has changed. The camera may be moved, e.g., manually, randomly, by a user controlled object moving within the virtual world, or by some other event. When the camera moves, WOM 209 in step 703 resets a current priority level $P_c$ to priority level 1 (or whatever the designation is for the highest priority level).

In step 705 the WOM 209 checks to see if there any loaders at the current priority level that have not processed incoming and outgoing cells for the new camera location. If there is at least one loader that has not processed incoming and outgoing cells, the WOM 209 in step 707 selects the one or more loaders with a priority level equal to the current priority level, and checks database 207 to determine whether there are any incoming and/or outgoing cells for those loaders. In step 709, 710, and 711, if there are incoming cells for a loader, and all higher priority loaders have already loaded each cell, WOM 209 sends a load notification to the applicable loader(s) to load objects in the applicable incoming regions (i.e., those for which higher priority loaders have completed loading), and marks the flag(s) in database 207 accordingly (i.e., indicating that the loader has loaded objects in the incoming region(s)).

According to an aspect, the WOM 209 may maintain and manage two flags per region, one to indicate whether a load notification has been sent to a loader regarding a region (Boolean LoadNotificationSent), and one to indicate that the loader has completed loading that region (Boolean Loaded). In such an embodiment, step 711 includes sub-steps of sending a load notification to a loader for a particular region, setting the LoadNotificationSent flag for that loader/region, optionally waiting for a response from the loader that it has completed loading that region, and setting the Loaded flag. Alternatively, the WOM might not wait for a notification that loading is complete, and instead processes notifications that loading is complete in a different process. That is, the loading might not actually occur in step 711, but rather might occur in a different asynchronous process performed by the loader. The dual-flag system may be used, e.g., where the WOM 209 continuously monitors incoming and outgoing cells for all loaders, and sends load/unload notifications as needed. WOM 209 may use a loader's LoadNotificationSent flag to determine whether to send a load notification to that loader, whereas WOM 209 may use a loader's Loaded flag to determine whether to send a load notification to one or more lower priority loaders.

In steps 713 and 715, if there are any outgoing regions for the currently selected loader(s), WOM 209 sends a notification to the applicable loaders to unload objects from the outgoing cells, and notifies database 207 to unmark the flags corresponding to those cells. For example, in step 715, WOM 209 sends an unload notification to a loader for a cell, optionally waits to receive a notification from the loader that unloading is complete in that cell, and resets the LoadNotificationSent and Loaded flags. Each loader may independently calculate or determine incoming and/or outgoing cells, or the WOM 209 may pass an indication of the incoming and/or outgoing cells as part of the notification to that loader to load/unload objects.

In step 717 the WOM 209 adjusts the priority level to the next lowest priority level, and returns to step 705 to determine whether there are any loaders at that priority level that have not yet processed incoming and outgoing cells for the current camera location. The method proceeds through all priority levels in descending order and, once all loaders have processed incoming and outgoing cells, the method returns to step 701 to wait for another camera movement event.

As is evident from the method of FIG. 7, as the camera location moves through the virtual world, e.g., representing the view of a pilot in an airplane navigating the virtual world, the WOM 209 may check database 207 as cells come into and go out of view of the camera. If each cell's spatial parameters fall into those required by a loader, that loader is notified of the need to load the objects corresponding to that loader into that cell once all loaders of higher priority have completed processing for that cell. When the loader loads its objects into the space (or unloads as applicable), the loader notifies the WOM 209 that processing is complete. The WOM 209 then notifies the next lowest priority loader to process incoming and outgoing cells for that loader. While FIG. 7 illustrates that cell unloading is also processed in priority order, this need not be the case, and loaders may unload cells without regard to whether higher or lower priority loaders have already unloaded their respective objects for those cells.

Because loaders load objects in priority order, a loader knows with certainty that it should not overwrite or conflict its own objects with any objects already loaded in a cell. Thus, step 711 may include the loader querying database 207 for the locations of objects already placed within the cell, and the loader then loads objects in non-conflicting locations within the cell.

FIG. 8 illustrates an alternative method that may be used to implement the pseudocode of FIG. 6. The method of FIG. 8 represents a cyclical method which may be particularly useful when the camera location is constantly moving, and it may thus be infeasible to process every applicable loader prior to the camera's next movement event, e.g., due to limited or slow computer resources. The cyclical method of FIG. 8 is not limited to such use, however. Each time WOM 209 returns to step 803 it is referred to herein as an iteration, whereas each time WOM 209 returns to step 801 it is referred to herein as a cycle.

In step 801, WOM 209 resets the current priority level $P_C$ to the highest priority level. Next, in step 803, the WOM 209 determines incoming and outgoing cells for each loader at that priority level since the last cycle, based on the current camera position, and based on the cell size and loading radius of the loader. WOM 209 may determine incoming and outgoing cells, e.g., by comparing the cells presently located in a loader's loading radius with the load status flags in database 207 to determine which cells need to be loaded and unloaded for each loader. For each loader at that priority level for which there is at least one incoming cell, the WOM 209 determines whether all higher priority loaders have processed those incoming cell(s) as applicable (i.e., the incoming cell is also in the higher priority loader's loading radius, and the higher priority loaders have completed loading based on Loaded flags being set for each loader/region), and sends a notification in step 805 to that loader to load objects in the incoming cell(s) which have been processed by all higher priority loaders. As with the method of FIG. 7, in step 805 the WOM 209 sends a load notification to a loader for a cell, and sets the LoadNotificationSent flag. The WOM 209 may then continue processing without waiting for a notification from the loader that it has completed loading objects in that cell. However, whenever the WOM 209 does receive such a notification, WOM 209 sets the Loaded flag for that loader/cell.

For each loader at that priority level for which there is at least one outgoing cell, WOM 209 sends a notification in step 807 to that loader to unload objects in the outgoing cell(s). WOM 209 optionally need not wait for all higher priority loaders before sending a notification to a loader to unload objects from a cell. Each loader may independently calculate or determine incoming and/or outgoing cells upon receiving a load or unload notification, or the WOM 209 may pass an indication of the cell(s) to be processed as part of the notification to that loader.

After notifying all loaders at the current priority level to load/unload objects as applicable, in step 809 the WOM 209 adjusts the current priority level $P_C$ to the next lowest priority level. In step 811 the WOM 209 determines whether there are any loaders having priority=$P_C$. If there are, WOM 209 returns to step 803 to process incoming and outgoing cells for loaders with priority=$P_C$. If in step 811 there are no loaders at the current priority level, WOM 209 in step 813 determines whether there are any more priority levels. If so, WOM 209 returns to step 809 to increment priority levels. If not, WOM 209 returns to step 801 where WOM 209 resets the current priority $P_C$ to the highest priority level. WOM 209 then starts over and again iterates through all the priority levels.

The method of FIG. 8 does not necessarily wait for a notification that a camera has moved, but instead determines incoming and outgoing cells based on the camera position each time the method iterates through step 803. Thus, the camera may move at any time during the process, including subsequent to processing incoming cells by a higher priority loader. For example, subsequent to the first iteration of step 803, where WOM 209 processes incoming and outgoing cells for loaders having the highest priority level (e.g., priority level 1), the camera may move prior to the second iteration of step 803. Thus, during the second iteration of step 803, the WOM 209 may determine that there are incoming and outgoing cells for a loader having the second highest priority level (e.g., priority level 2), for which a loader having priority level 1 has not yet processed the cell(s). In such a case WOM 209 does not notify the lower priority loader to process incoming, but instead waits until the next cycle, at which time the higher priority loader will have loaded objects in the cell(s).

The methods of FIG. 7 and FIG. 8 are illustrative, and are not the only ways to implement the pseudocode of FIG. 6. One or more steps in FIG. 7 and FIG. 8 may be optionally, and the steps might not necessarily be performed in the recited order. Multiple steps may be combined together, and additional steps may be added or split off other steps. In addition, a multithreaded and/or asynchronous method may be used, whereby the WOM is constantly processing incoming cells and outgoing cells based on camera movement. Whenever WOM 209 identifies an incoming cell for a current loader, WOM 209 checks database 207 to see if the Loaded flag is set for all higher priority loaders for that cell and, if so, whether the current loader's LoadNotificationSent flag is set for that cell. If the LoadNotificationSent flag is set or if not all higher priority loader's Loaded flags are set, WOM 209 does nothing and continues processing. If the LoadNotificationSent flag is not set and all higher priority loader's Loaded flags are set, WOM 209 sends a load notification to the loader for that cell. The LoadNotification may be sent from the WOM to the Loader with no expectation that the load actually takes place before the loader returns from that notification—the load can take place at any point in time afterward.

Figure 9:
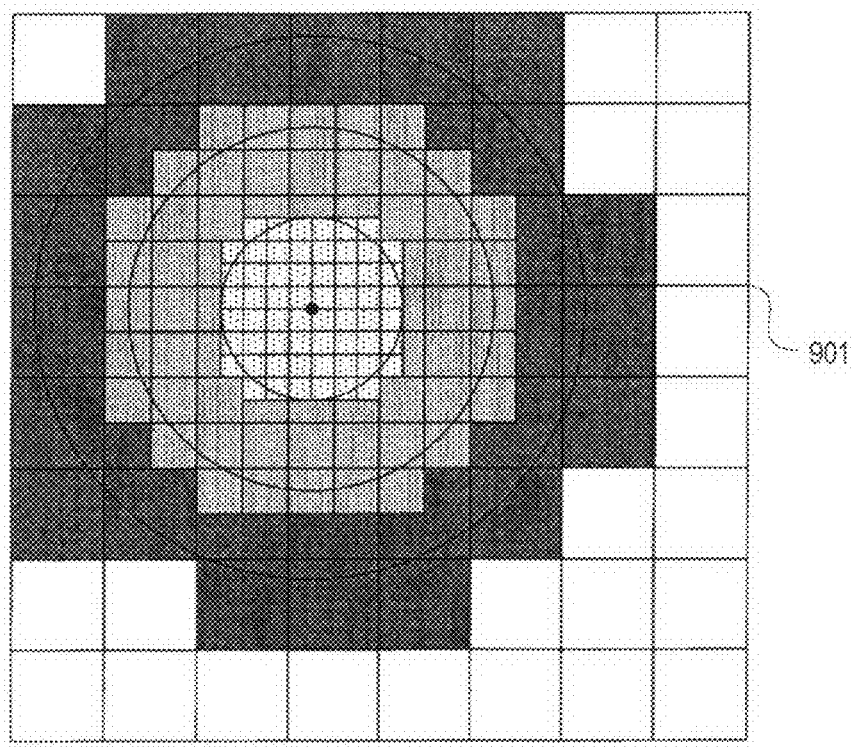
FIG. 9 illustrates a terrain map where loaders have varying cell sizes according to one or more illustrative aspects described herein.

In the examples of FIGS. 4-5, each loader has a common cell size. However, as discussed above, each loader need not have the same cell size. FIG. 9 illustrates a terrain map 901, based on a camera position similar to FIG. 4, where each loader has a different cell size. In such a scenario, database 207 may track cells based on the minimum cell size in use or on a minimum allowable cell size.

According to an aspect of the methods and systems described herein, loaders may be statically predefined, or loaders may be dynamically defined and modifiable by software extensions utilizing one or more programming interfaces exposed by or to WOM 209 and/or to some other loader control module for adding/removing loaders. Various illustrative programming interfaces are described below. While specific variables, constants, descriptors and other names are used, those of skill in the art will appreciate that names are descriptive only, and programming interfaces are not limited to the use of any specific name.

In the illustrative programming interfaces described herein, QMID represents a two-dimensional coordinate for a cell in a grid, combined with a cell size (e.g., 1 km, 512 m, etc.). The following programming interface may be used to define the notification signature when a cell enters a loader's loading radius (i.e., is an incoming cell), where RegionEnterScopeNotification represents a function signature definition for a call from WOM 209 to the loader to communicate that a cell should be loaded and the QMID passed is the coordinate of that cell. When the loader registers with the WOM it has a function pointer that matches that signature to accept those notifications, and *PRegionEnterScopeNotification represents a pointer to RegionEnterScopeNotification:

```
//
// defines the Enter Scope Notification call signature
//
typedef void RegionEnterScopeNotification(QMID& qmid);
typedef RegionEnterScopeNotification *PRegionEnterScopeNotification;
```

The following programming interface may be used to define the notification signature when a cell leaves a loader's loading radius (i.e., is an outgoing cell), where RegionExitScopeNotification represents a function definition for a call from WOM 209 to the loader to notify the loader to unload a cell, and the QMID passed is the coordinate of the cell to be unloaded., and *PRegionExitScopeNotification represents a pointer to RegionExitScopeNotification:

```
//
// defines the Exit Scope Notification call signature
//
typedef void RegionExitScopeNotification(QMID& qmid);
typedef RegionExitScopeNotification *PRegionExitScopeNotification;
```

The following data structure may be used by a loader to define its hierarchical spatial requirements, as well as requisite incoming and outgoing cell procedure calls, and then may be used to pass the data to the WOM 209 (or its equivalent), where m_pEnterScopeNotification and m_pExitScopeNotification represent structures to hold function pointers to the load and unload notification callbacks into this particular loader:

```
//
// each loader creates and fills out one of these structures and
// registers it to the notification system via the API's below
//
class WorldObjectLoader
{
public:
PRegionEnterScopeNotification m__pEnterScopeNotification;    // Called for each cell that enters this loader's scope
PRegionExitScopeNotification m__pExitScopeNotification;      // Called for each cell that leaves this loader's scope
FLOAT32         m__fRadius;           // the radius of this loader
unsigned int    m__uQmidLevel;        // the size of the cell for this loader
unsigned int    m__uPriority;         // the priority of this loader
};
```

The following programming interfaces may be used to register and unregistered loaders with the WOM 209 where WorldObjectLoader* and pLoader represent the loader's interface with WOM 209. RegisterWorldObjectLoader( ) Fexpects a pointer to the WorldObjectLoader's interface from which it gets the callback function pointers and the spatial description of how the loader expects to receive notifications:

```
//
// API's into the notification system
//
void RegisterWorldObjectLoader(WorldObjectLoader* pLoader);
void UnregisterWorldObjectLoader(WorldObjectLoader* pLoader);
```

The following programming interface may be used by a registered loader to notify the WOM 209 that the loader has finished loading objects for a specified region:

```
//
// After receiving an EnterScopeNotification( ) for a region, the Loader
// loads for that region. When the Loader finishes for that region it must
// call the notification system via this call to signal that loading is finished
//
virtual void DoneLoadingNotification(QMID& qmid, unsigned int uPriority) = 0;
```

Thus, using programming interfaces similar to those described above, third party developers may develop add-ons that define and implement additional loaders for new objects to be placed within the virtual world. For example, a third-party might develop an add-on or extension to represent or simulate forest-fires. The third-party might develop a loader that registers with the WOM 209, indicating its priority level (e.g., at some time after tree objects have been loaded), loading radius, and cell size. When the loader is notified of incoming cells, the loader might perform some calculation to determine whether or not a forest fire should be loaded in or around previously placed trees.

While aspects have been described with respect to loading and unloading 3D objects in a graphically simulated virtual environment, features described herein may be used to provide an extensible system that performs layering of dependent spatial data. Various aspects of the present invention include any novel feature or combination of features disclosed herein either explicitly or any generalization thereof, in order to provide an extensible, hierarchical, and/or prioritized, spatial object loading and unloading system. While features have been described with respect to specific examples including presently preferred modes of carrying out features of the invention, those skilled in the art will appreciate that there are numerous variations and permutations of the above described systems and techniques. Thus, the spirit and scope of the invention should be construed broadly as set forth in the appended claims.

I claim:

1. A computer implemented method of loading virtual objects in a graphically simulated virtual environment divided into a plurality of cells, wherein the method is implemented by a computing system having a processor and memory having stored computer-executable instructions which, when executed by the processor, implement the method, and wherein the method comprises:

an object manager of the computing system identifying a plurality of discrete and separate loaders which are managed by the object manager, wherein each loader loads a corresponding type of object, and wherein each loader has a corresponding priority level and a corresponding loading radius;

determining a current camera position within the virtual environment;

upon determining that the current camera position is different than a previous camera position, resetting a current priority level that is used by the object manager to determine when to send notifications to one or more of the plurality of loaders to load or unload corresponding objects;

the object manager checking a database that maintains data for each cell within the virtual environment and determining whether there are any incoming cells and whether there are any outgoing cells for any loaders based on the loading radius corresponding to each loader, wherein an incoming cell for a corresponding loader is a cell within the loading radius of the corresponding loader based on the new current camera position, and which was not within the loading radius of the corresponding loader based on the previous camera position, and wherein an outgoing cell for a corresponding loader is a cell which is outside of the loading radius of the corresponding loader based on the new current camera position and which was previously within the loading radius of the corresponding loader based on the previous camera position; and performing the following for a plurality of different priority levels:

the object manager sending, to each loader that has a priority equal to the current priority, a load notification instructing each loader to load the object corresponding to that loader into any incoming cell associated with that loader and to unload the corresponding object associated with that loader from any outgoing cell associated with that loader; and the object manager adjusting the current priority level to a value of one of the plurality of different priority levels.

2. The method of claim 1, further comprising receiving a notification from a first loader upon completion of loading its corresponding objects in each cell.

3. The method of claim 1, wherein the method further comprises querying a data structure within the database that maintains one flag per loader per cell, each flag indicating a load status of a corresponding loader in the cell, the load status indicating whether the corresponding loader in that cell has a status of loaded or unloaded.

4. The method of claim 1, further comprising defining a cell size corresponding to each loader.

5. The method of claim 4, wherein each loader has a same cell size.

6. The method of claim 4, wherein at least two loaders have different cell sizes.

7. The method recited in claim 1, wherein the method further includes: each loader, prior to loading the object into a particular incoming cell, verifying that the corresponding object is being loaded into a non-conflicting location within the particular incoming cell and based on querying the database for locations of objects already placed within the particular incoming cell.

8. A computer readable storage medium storing computer executable instructions for performing the method of claim 1.

9. The computer readable storage medium of claim 8, wherein each loader has a corresponding cell size, and the object manager determines any cell to be within the loading radius of any loader for which any part of the cell is within the loading radius from the current camera position.

10. The computer readable storage medium of claim 8, further comprising a data structure storing an array of flags, each flag corresponding to a load status of a loader module within a single cell, and the array of flags comprising one flag per loader per cell.

11. The computer readable storage medium of claim 10, wherein the object manager maintains flag states in accordance with an actual load status of each loader.

12. The computer readable storage medium of claim 11, wherein each loader notifies the object manager upon loading objects in any given cell.

13. The computer readable storage medium of claim 8, wherein the world object manager notifies each loader to unload objects in any cell that leaves the loading radius of the each loader module.

14. The computer readable storage medium of claim 8, wherein the world object manager exposes a programming interface for registering a loader.

15. The computer readable storage medium of claim 14, wherein the world object manager exposes a programming interface for the loader to identify a routine to be called by the object manager when a cell is determined to enter a loading radius of the loader.

16. The computer readable storage medium of claim 14, wherein the object manager exposes a programming interface for the loader to identify a routine to be called by the object manager when a cell is determined to leave a loading radius of the loader module.

17. The computer readable storage medium of claim 14, wherein the object manager defines a data type describing a generic loader, and wherein the programming interface receives a pointer to an instance of the data structure describing the generic loader.

18. The computer readable storage medium recited in claim 8 further comprising:

a first loader module having a highest priority level and a first loading radius, the first loader module for loading terrain objects in a graphically simulated virtual environment for a flight simulation computer game;

a second loader module having a second highest priority level and a second loading radius, the second loader module for loading landmark objects in the graphically simulated virtual;

a third loader module having a third highest priority level and a third loading radius, the third loader module for loading terrain cover objects in the graphically simulated virtual environment;

a world object manager module that notifies each of the first, second, and third loader modules to load objects in a cell within the loading radius of the each loader module from a current camera position when all higher priority loader modules having the cell within their respective loading radii have completed loading their respective objects in the cell, wherein the current camera position is based on a position of a simulated airplane flying within the graphically simulated virtual environment.

19. The computer readable storage medium of claim 18, wherein the first loading radius, second loading radius, and third loading radius are non-uniform, wherein each of the first loader module, second loader module, and third loader module loads objects based on a first cell size, second cell size, and third cell size, respectively, and wherein the first cell size, the second cell size, and the third cell size are non-uniform.

\* \* \* \* \*

UNITED STATES PATENT AND TRADEMARK OFFICE
CERTIFICATE OF CORRECTION

| | | |
|---|---|---|
| PATENT NO. | : 7,804,501 B2 | |
| APPLICATION NO. | : 11/275131 | |
| DATED | : September 28, 2010 | |
| INVENTOR(S) | : Joseph F. Stacy | |

It is certified that error appears in the above-identified patent and that said Letters Patent is hereby corrected as shown below:

In column 20, line 17, in Claim 16, after "loader" delete "module".

Signed and Sealed this
Tenth Day of May, 2011

David J. Kappos
*Director of the United States Patent and Trademark Office*